UNITED STATES PATENT OFFICE.

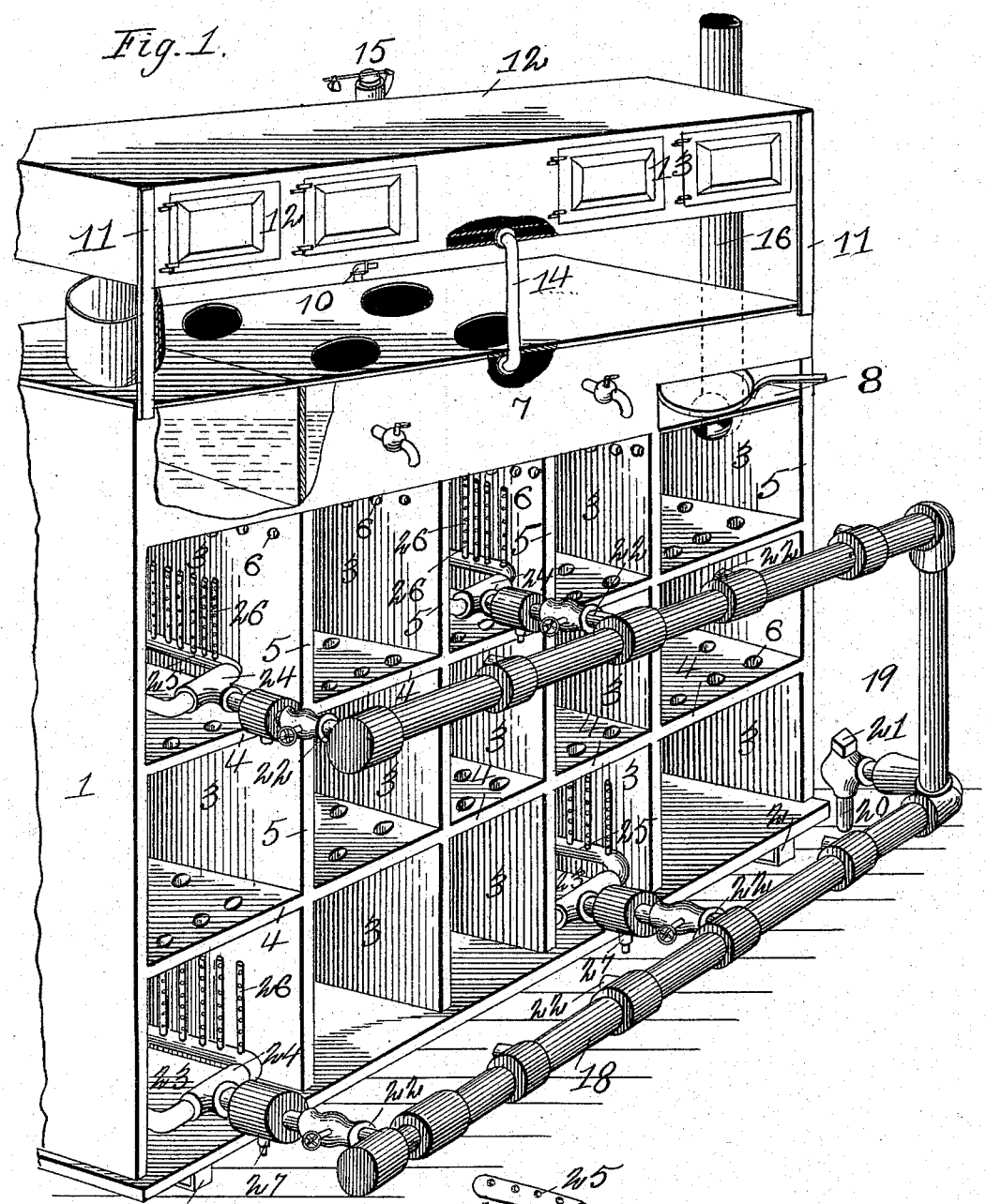

FREDRECKS C. DE PRENGAL, OF WASHINGTON, DISTRICT OF COLUMBIA.

GAS RANGE OR COOKING-CABINET.

SPECIFICATION forming part of Letters Patent No. 530,509, dated December 11, 1894.

Application filed August 3, 1892. Serial No. 442,048. (No model.)

*To all whom it may concern:*

Be it known that I, FREDRECKS C. DE PRENGAL, a citizen of the United States, residing at Washington, District of Columbia, have invented certain new and useful Improvements in Gas Ranges or Cooking-Cabinets; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in gas ranges or cooking cabinets; and it consists in combining and arranging a series of cooking-chambers and a steam-generating chamber in a single structure, and in the combination and arrangement of mechanism for supplying the heat to the same.

The invention further consists in means for carrying off the disagreeable odors arising from the cooking of certain articles, as will be hereinafter more fully explained.

The object of the invention is to provide a cooking apparatus, of the class generally denominated "ranges," which shall be adapted for use in private dwellings or hotels and restaurants, by diminishing or increasing its size or the number of its chambers, and capable of roasting, baking, boiling, steaming, frying, and broiling various articles of food in the most perfect manner, without the presence of the obnoxious odors usually attendant upon cooking apparatus of this character.

This object is attained by the mechanism illustrated in the accompanying drawings, in which—

Figure 1 represents a front perspective view of a range made in accordance with my invention, parts being broken away to show the construction of certain portions of the apparatus, and some of the burners omitted from a number of the chambers and their branch supply-pipes broken off, to more clearly show the general construction of the cooking or heating-chambers, and Fig. 2, a modified form of the burner.

Referring to the drawings, the numeral 1 indicates the body or casing, which may be of any approved shape, preferably rectangular, and constructed of any suitable material, preferably sheet iron. The body or casing is supported upon legs or feet 2, and is divided into a series of heating or cooking-chambers 3, by means of horizontal partitions 4 and vertical partitions 5.

In the construction shown in the drawings, there are three tiers of cooking or heating-chambers, but it will be understood that a lesser or greater number may be employed. The horizontal partitions, and the vertical partitions of the upper tier, are provided with perforations 6, for the proper circulation of heat and the carrying off of the odors, the perforations in the vertical partitions being made in the upper part thereof.

Situated in the upper part of the body or casing, above the tiers of cooking or heating-chambers, is a steam generator, 7, and a frying-chamber, 8, the top of said steam generator being provided with holes for the reception of various cooking utensils. Said holes may be provided with suitable covers to close the same when not in use. The steam generator is provided with suitable cocks, by means of which hot water may be drawn off as needed for washing dishes and other purposes.

9 indicates a steamer, which is connected with the steam generator and may be used for steaming purposes. Water is supplied to the generator by means of a supply-pipe, 10.

Mounted above the steam generator and frying-chamber, upon suitable supports 11, is a casing, 12, having hollow end and back walls, and bottom and top. The interior of the casing is divided into baking-chambers 13, provided with suitable doors, and a pipe, 14, leading from the steam generator to the hollow bottom, supplies steam to heat said chambers. 15 indicates a safety valve, which operates to regulate the steam pressure in the space surrounding the baking-chambers, when said pressure becomes too great or the chambers too hot.

The numeral 16 indicates a ventilating-pipe, leading from the frying-chamber 8, to the chimney or into the open air, and by means of which the odor arising from the cooking is carried off.

The numerals 17 and 18 indicate two horizontal pipes, the upper one being situated in front of the upper tier of cooking or heating-chambers and the other one in front of the lower tier of chambers, said pipes being connected together, at one end, by a pipe, 19, and supplied with gas by means of a supply-pipe, 20, which is provided with a cut-off cock, 21. Each horizontal pipe is provided with a series of short branch pipes, 22, one for each chamber, and each of said branch pipes is provided with and carries a fork-shaped burner, 23, which is composed of a short pipe, 24, and two pipes 25, each provided with a series of vertical burner-tubes 25. Each branch-pipe 22 is provided with an air-inlet pipe, 27, by means of which a sufficient quantity of air is caused to mingle with the gas, to insure perfect combustion and thereby prevent smoking and the formation of soot. The openings of the air-inlet pipes are at some distance from the flame, so that should gas escape there would be but little, if any, danger of it igniting. The branch-pipes are furnished with the usual valves or cocks, for regulating and controlling the supply of gas to the burners.

In the modified form of burner shown in Fig. 2, the vertical tubes are dispensed with and the gas-vents are made in the pipes 25, which, in this instance, serve as burner-tubes. With this form of burner cooking utensils may be set directly upon the burner. The chambers may be supplied with both forms of burners.

In operating my invention, the middle tier of chambers is heated by the heat from the lower tier of chambers passing up through the perforations in the horizontal partition, forming the bottoms of said middle tier of chambers. The water in the steam generator is heated by the row of burners situated in the upper tier of chambers, and as steam is made it is conducted to the hollow space surrounding the baking or warming-chambers. When articles are to be broiled, the article is first properly prepared and then secured on the broiler and placed within one of the chambers, which is provided with a burner having the vertical burner-tubes, in an upright position, so that the flame will be directed against both sides of the article at the same time, thereby obviating the constant turning of first one side and then the other of the article to the flame, as is required by the ordinary method of broiling. Any odor or fumes arising from the articles being cooked, in any of the chambers, will pass up through the perforations in the horizontal partitions into the upper tier of chambers, and from thence, through the perforations in the vertical partitions, to the frying-chamber, from whence they are conducted to the flue or chimney by means of the ventilating pipe.

The apparatus is compact in form, requiring but little space, and the construction and arrangement of the various cooking and other chambers render it of great utility and convenience, alike to the hotel and restaurant as well as the private household.

Having thus fully described my invention, what I claim as new, and desire to secure by Letters Patent, is—

1. The combination, of a number of cooking or heating chambers arranged in tiers, the chambers of one tier having gas-burners and being in communication with each other and with the chambers of the next lower tier, and the chambers of the lowermost tier also having burners and being in communication with the chambers of the intermediate tier, the chambers of the intermediate and lowermost tiers being separated by imperforate walls.

2. The combination, with a frying-chamber having an outlet, of a number of cooking or heating-chambers arranged in tiers, the chambers of one tier having gas-burners and being in communication with each other and with the chambers of the next lower tier; as well as with the frying-chamber, and the chamber of the lowermost tier also having burners and being in communication with the chambers of the intermediate tier, the chambers of the intermediate and lowermost tiers being separated by imperforate walls.

3. The combination, of a number of cooking or heating-chambers arranged in tiers, the chambers of one tier having gas-burners and being in communication with each other and with the chambers of the next lower tier, and the chambers of the lowermost tier also having burners and being in communication with the chambers of the intermediate tier, the chambers of the intermediate and lowermost tiers being separated by imperforate walls, and a steam generator and cooker supported in proximity to the upper tier of chambers, so as to receive heat therefrom.

In testimony whereof I affix my signature in presence of two witnesses.

FREDRECKS C. DE PRENGAL.

Witnesses:
S. BRASHEARS,
G. DITTMAR.